(12) United States Patent
Chang

(10) Patent No.: US 7,753,673 B2
(45) Date of Patent: Jul. 13, 2010

(54) DEVICE FOR FORMING OPTICAL LENSES

(75) Inventor: Jen-Tsorng Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 203 days.

(21) Appl. No.: 12/143,640

(22) Filed: Jun. 20, 2008

(65) Prior Publication Data
US 2009/0053353 A1 Feb. 26, 2009

(30) Foreign Application Priority Data
Aug. 21, 2007 (CN) .......................... 2007 1 0201419

(51) Int. Cl.
*B29C 59/04* (2006.01)
(52) U.S. Cl. .................. 425/374; 264/1.32; 425/363; 425/385; 425/808
(58) Field of Classification Search .............. 425/363, 425/374, 385, 808; 264/1.32
See application file for complete search history.

(56) References Cited

U.S. PATENT DOCUMENTS

| 1,452,742 | A | * | 4/1923 | Johnston | 425/374 |
| 6,110,401 | A | * | 8/2000 | Lee et al. | 425/385 |
| 6,829,050 | B2 | * | 12/2004 | Ikeda et al. | 425/374 |

* cited by examiner

*Primary Examiner*—James Mackey
(74) *Attorney, Agent, or Firm*—Andrew C. Cheng

(57) ABSTRACT

A device for forming optical lenses includes a base, a driving mechanism mounted on the base, a controller connected to the driving mechanism and a roll forming die. The controller is configured for controlling the driving mechanism. The roll forming die includes a roller, a number of mold cores attached to the roller, and a molding material container disposed on the base and spaced with the roller. The roller is mechanically coupled to the driving mechanism such that the roller can be driven to rotate by the driving mechanism, the roller, the mold cores and the molding material container are arranged to cooperatively form workpieces. A number of mounting holes are defined in the roller; each of the mold cores is mounted in a corresponding mounting hole. The device for forming optical lenses can reduce internal stress of produced optical lenses.

10 Claims, 10 Drawing Sheets

DEVICE FOR FORMING OPTICAL LENSES

BACKGROUND

1. Technical Field

The present invention generally relates to a device for forming optical lenses, particularly, to a device for forming optical lenses for producing optical lenses.

2. Discussion of Related Art

With continuous development of multimedia technology, electronic devices such as digital cameras, digital camcorders, and mobile phones having camera module are becoming more and more popular. These electronic devices are required to be small in size and provide good image quality Lens employed in these products play an important role in obtaining a good image quality.

Typically, a lens module includes a plurality of lenses, optical filters and an image sensor. Lenses are usually made of glass or transparent plastic material. Glass lenses are generally made by mold pressing, and plastic lenses are generally made by injection molding.

However, lenses made by injection molding may subject to internal stress caused by process conditions, such as injection rate, injection pressure and injection time. The internal stress may cause deformation of the lenses thus, deteriorates optical performance of the lenses. For example, refractive index of the lenses may be deflected. Referring to IEEE, International Symposium on Polarization Analysis and Applications to Device Technology, 1996, "Dynamic variation of internal stress distribution in the curing process of epoxy resin using highly sensitive birefringence measurement system", Shigekazu Yamagishi also discloses how internal stress influence lenses' optical performance.

Therefore, there is a desire to develop a device for producing lenses with reduced internal stress.

SUMMARY

In one embodiment, the device for forming optical lenses includes a base, a driving mechanism mounted on the base, a controller connected to the driving mechanism and a roll forming die. The controller is configured for controlling the driving mechanism. The roll forming die includes a roller, a number of mold cores attached to the roller, and a molding material container disposed on the base away from the roller. The roller is mechanically coupled to the driving mechanism such that the roller can be driven to rotate by the driving mechanism. The roller, the mold cores and the molding material container are arranged to cooperatively form workpieces. A number of mounting holes are defined in the roller; each of the mold cores is mounted in a corresponding mounting hole.

This and other features and advantages of the present invention as well as the preferred embodiments thereof and a cleaning apparatus in accordance with the invention will become apparent from the following detailed description and the descriptions of the drawings.

BRIEF DESCRIPTION OF THE DRAWINGS

Many aspects of the present invention can be better understood with reference to the following drawings. The components in the drawings are not necessarily drawn to scale, the emphasis instead being placed upon clearly illustrating the principles of the present invention.

DETAILED DESCRIPTION OF THE PREFERRED EMBODIMENTS

Figure 1:
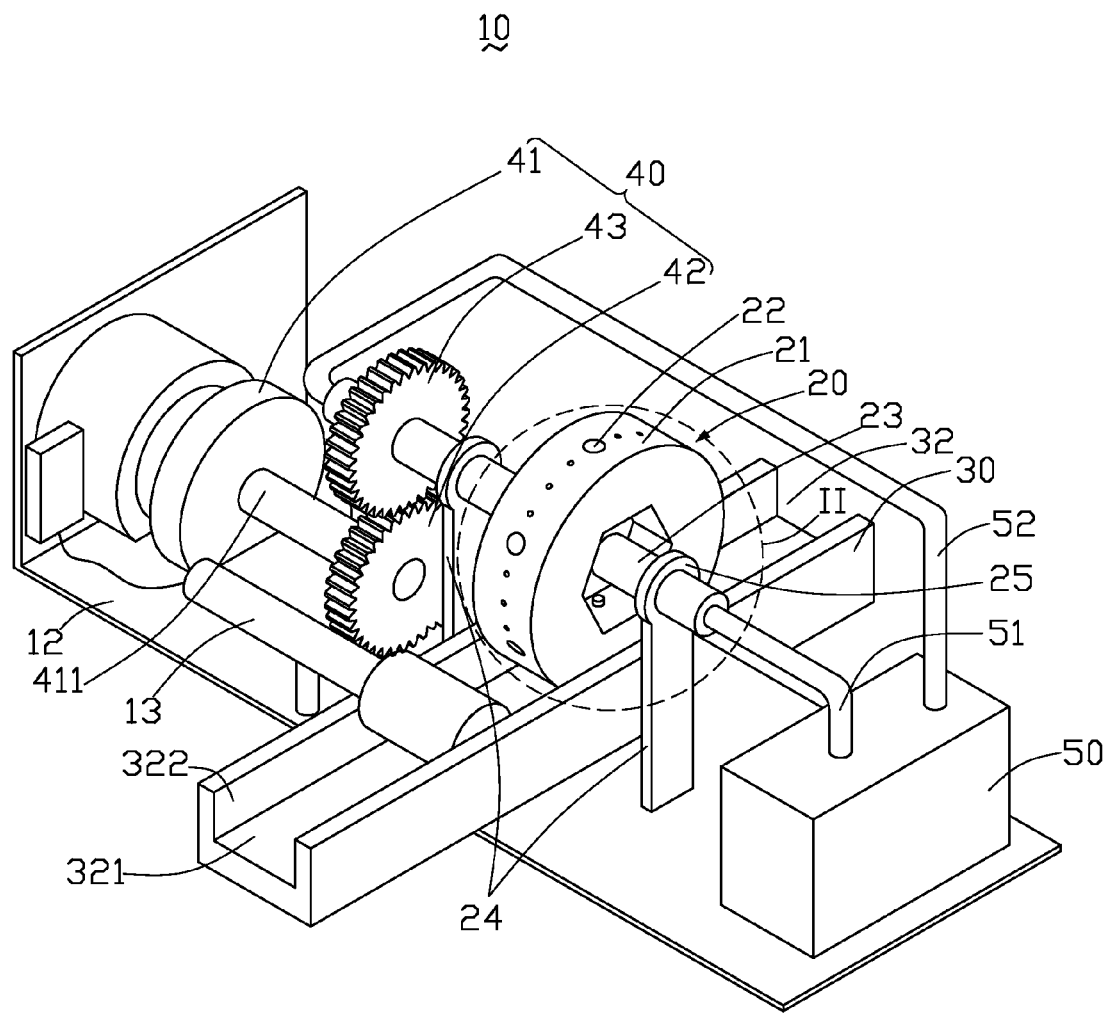
FIG. 1 illustrates a device for forming optical lenses in accordance with the present embodiment.

Referring to FIG. 1, the present embodiment provides a device 10 for forming optical lenses 11 (referring to FIG. 10), which includes a roller 20, a molding material container 30 and a driving mechanism 40. The roller 20 includes a circular peripheral side surface 21 and a number of molding structures 22 arranged on the peripheral side surface 21. The molding material container 40 includes an elongated channel 42 for containing a molding material and has a bottom surface 421 and two opposite inner side surface 422 in the channel 42. The roller 20 is received in the channel 42 and rotatable about an axis which is substantially perpendicular to a lengthwise direction of the elongated channel 32. The peripheral side surface 21 space a distance from the bottom surface 321 of the molding material container 30. The driving mechanism 40 is capable of driving the roller 20 to rotate. The device 10 and its components will be described in detail as following.

Figure 9:
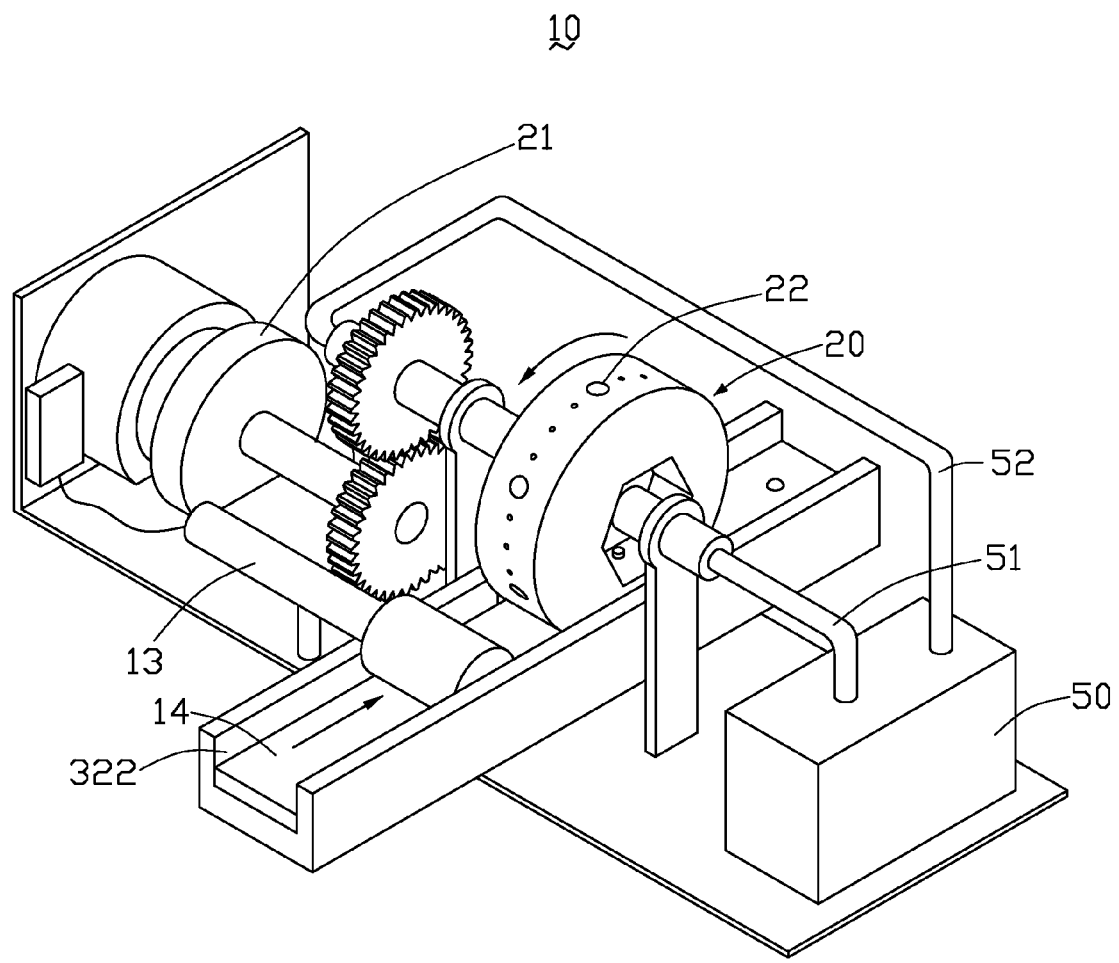
FIG. 9 is schematic view of a plate material is processed by the device for forming optical lenses of FIG. 1

In the present embodiment, the device 10 also includes a base 12 for supporting the molding material container 30 and two legs 24 with a bearing 25 mounted on a distal end. The two legs 24 vertically extend from the base 12. The roller 20 includes a hollowed shaft (referring to FIG. 4) 23 with two ends received in the two bearings 25 respectively. The shaft 23 is parallel with the base 12 and is perpendicular to the lengthwise direction of the elongated channel 32. In other words, the roller 20 is rotatable about the shaft 23 which is substantially perpendicular to a lengthwise direction of the elongated channel 32, and alternatively, a moving direction of a molding material (as shown in FIG. 9).

The driving mechanism 40 includes a motor 41, an active gear 42 and a driven gear 43. The active gear 42 is fixed to a main shaft 411 of the motor 41. The driven gear 43 is engaged with the active gear 42. The motor 41 drives the active gear 42 to rotate, and then the active gear 42 drives the driven gear 43 to rotate. The driven gear 43 is fixed to an end of the shaft 23. Thus, the roller 20 will rotate when the driven gear 43 rotates.

Figure 2:
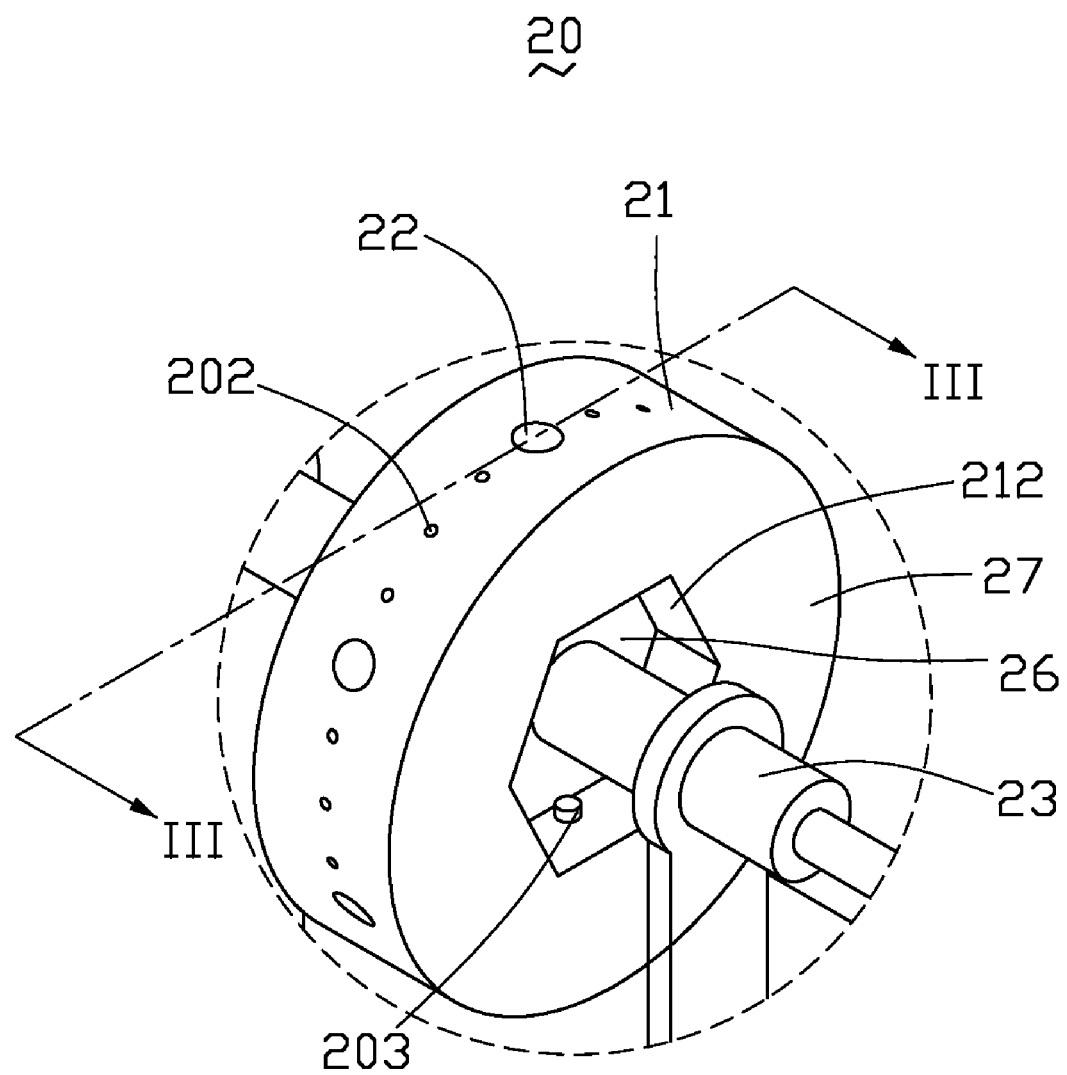
FIG. 2 is enlarged schematic view of area II in FIG. 1.
Figure 3:
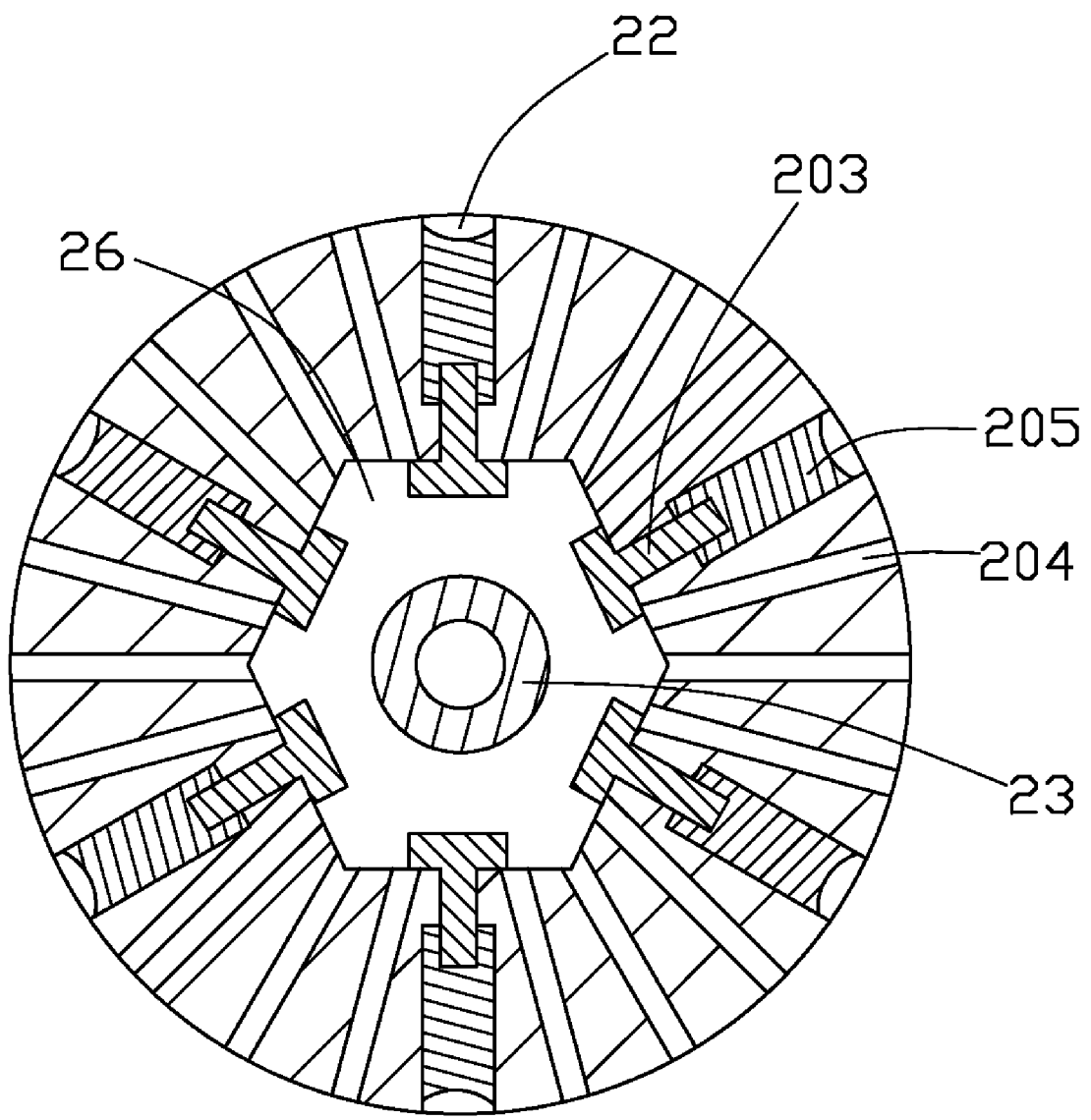
FIG. 3 is a cross sectional view of FIG. 2 along line III-III.

Referring to FIGS. 2 and 3, the roller 20 includes core portion 26 and a peripheral portion 27 extending outwardly. The shaft 23 passes through the core portion 26. A thickness of the core portion 26 is less than that of the peripheral portion 27. Thus, there is an inner side surface 212 formed between the core portion 26 and the peripheral portion 27. The inner side surface 212 and the core portion 26 cooperatively define a groove around the shaft 23. The peripheral portion 27 includes a number of through holes 204 extending from the inner side surface 212 to the peripheral side surface 21. The molding structures 22 are recesses defined in the peripheral side surface 21. In the present embodiment, a number of mold cores 205 received in mounting holes formed in the peripheral portion 27 define the recesses. Alternatively, the molding structures 22 can also be protrusions formed on the peripheral side surface 21. Each of the mold cores 205 is fixed in respective mounting hole by a bolt 203.

Figure 4:
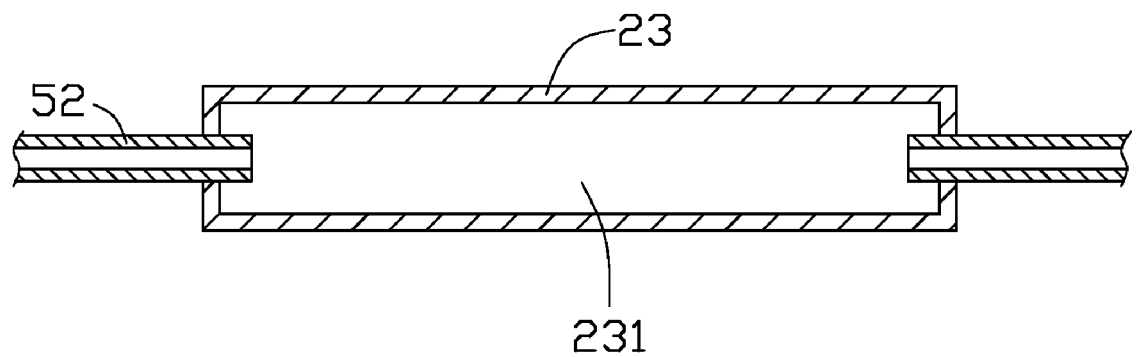
FIG. 4 is a cross sectional view of a hollowed shaft in the device for forming optical lenses of FIG. 1.

There is also a heating apparatus 50 arranged on the base 12 for providing a circulatory heating material to the roller 20. The heating apparatus 50 includes an output pipe 51 and a return pipe 52. As shown in FIG. 4, the shaft 23 is hollowed and includes a cylindric heating channel 231. Two ends of the heating channel 231 are respectively connected to the output pipe 51 and the input pipe 52. Thus, the heating material from the output pipe 51 can enter the heating channel 231 thereby facilitating maintaining a temperature of the roller 20. In addition, the device 10 also includes a heater 13 having a heating end 132 received in the elongated channel 32 for softening a material in the elongated channel 32.

Figure 5:
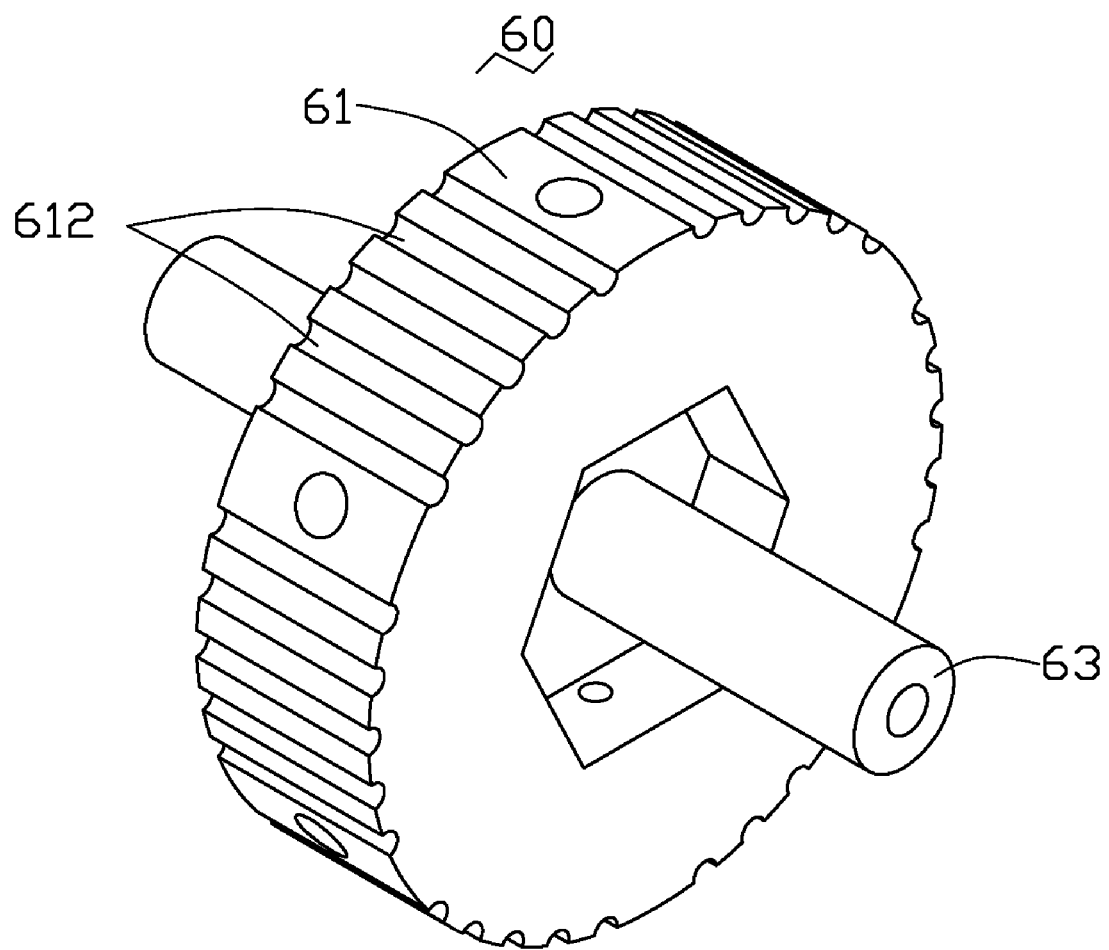
FIG. 5 is schematic view of another roller can be adapted in the device for forming optical lenses of FIG. 1.
Figure 6:
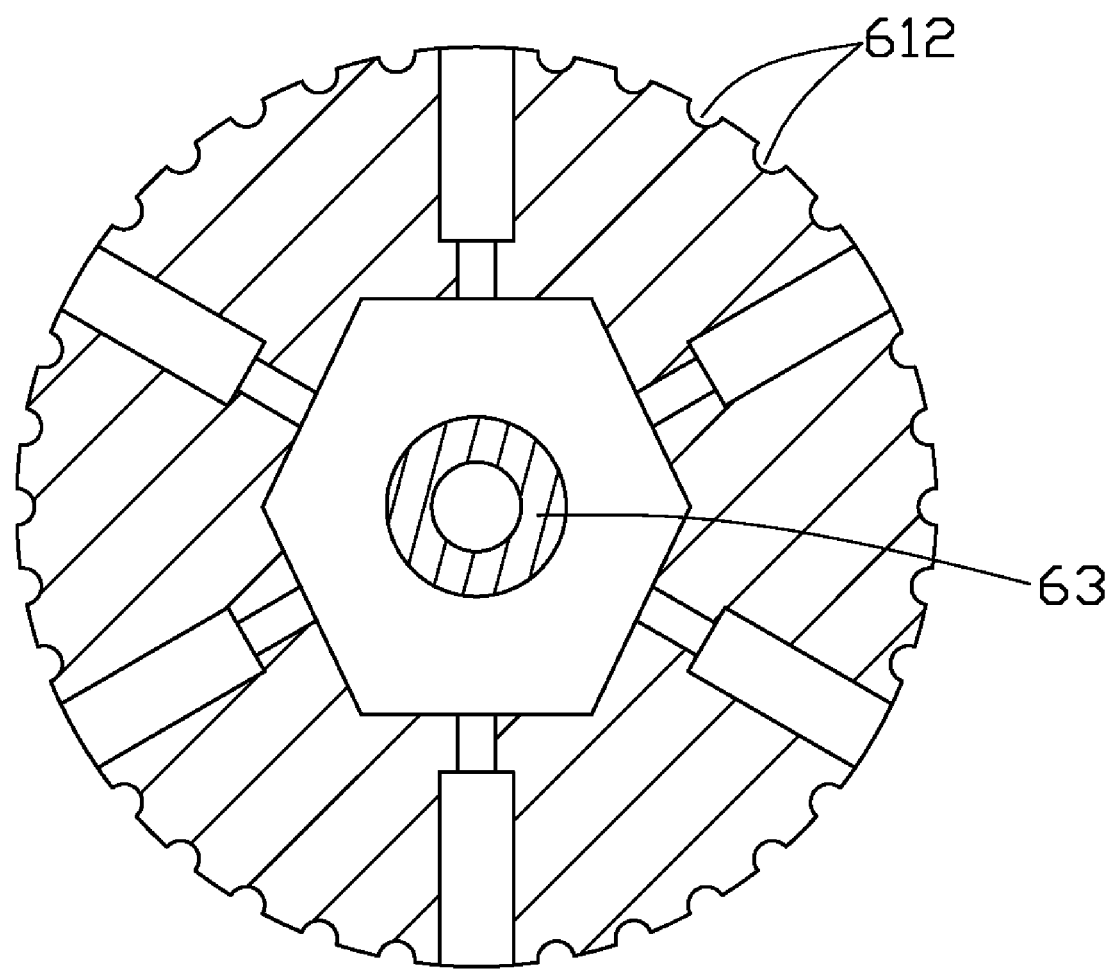
FIG. 6 is a cross sectional view of FIG. 5.

It is to be understood that the roller 20 can be replaced by other rollers having different structure, for example, as shown in FIGS. 5 and 6, a roller 60 in accordance with a second embodiment includes an shaft 612 and a peripheral side surface 61. A number of U-shaped discharging grooves 612 are defined in the peripheral side surface 61. The discharging grooves 612 are parallel with the shaft 63. The discharging grooves 612 are configured for discharging produced scraps during processing optical lenses. It is to be understood that a cross section of each discharging groove 612 can also be in other shape, for example, V-shape.

Figure 7:
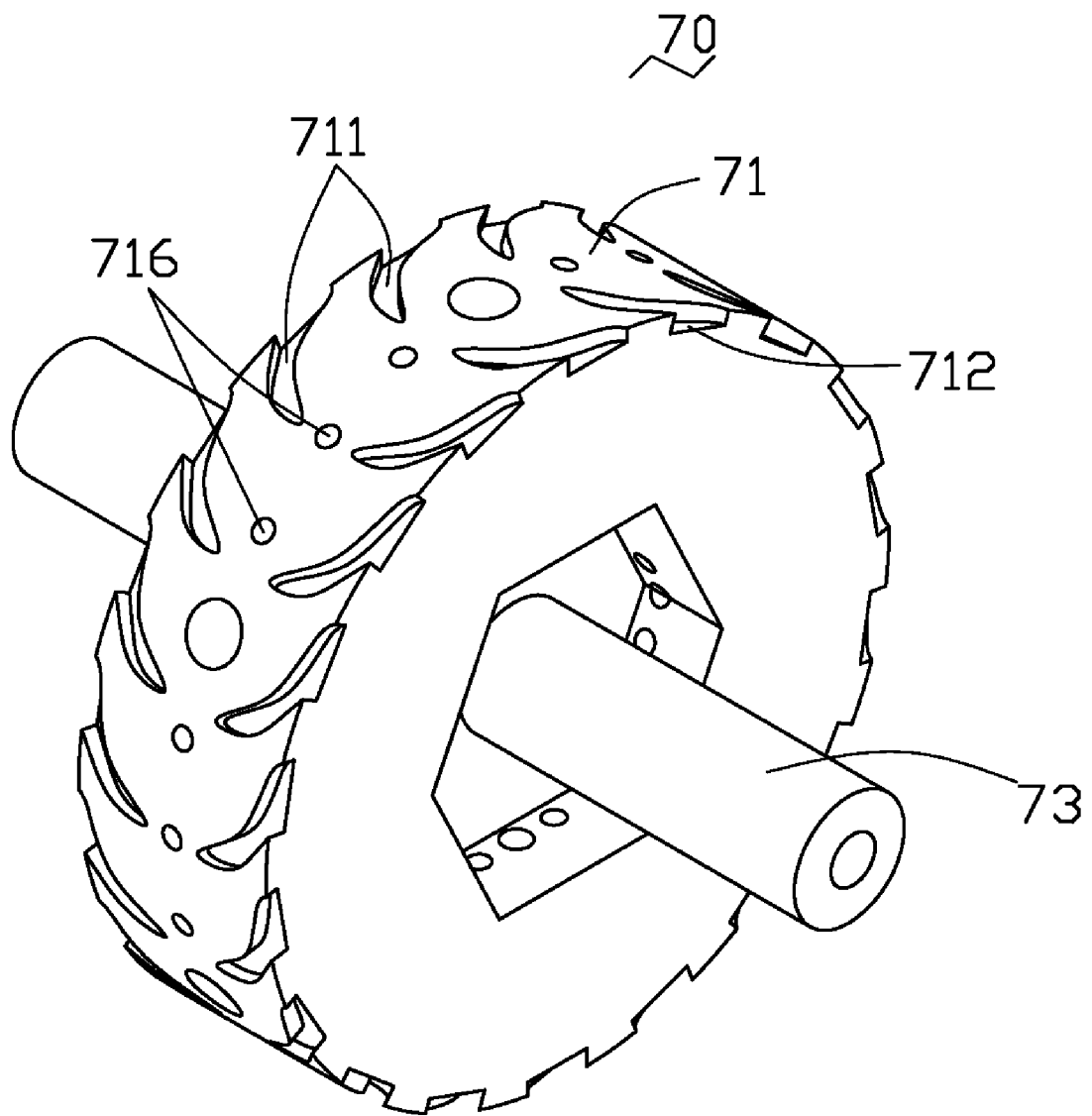
FIG. 7 is schematic view of still another roller can be adapted in the device for forming optical lenses of FIG. 1.
Figure 8:
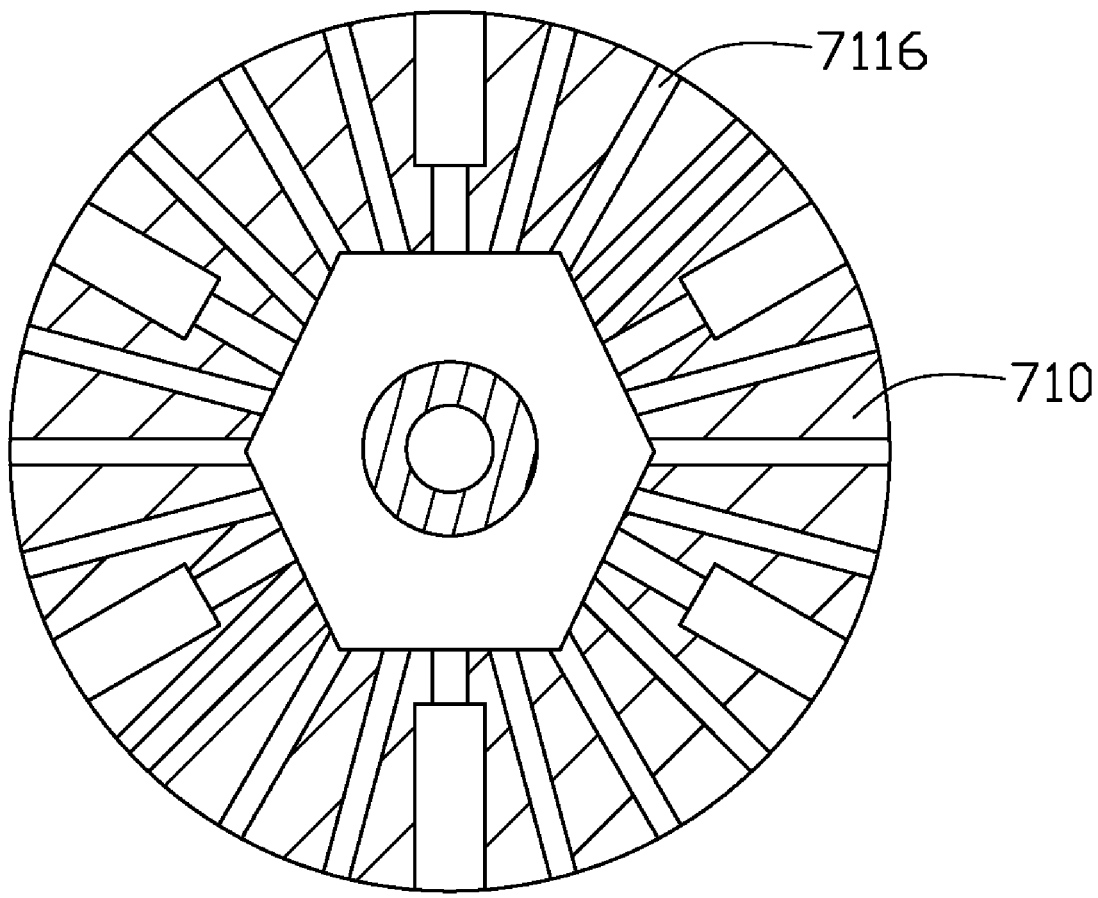
FIG. 8 is a cross sectional view of FIG. 7.

FIGS. 7 and 8 illustrate a roller 70 in accordance with a third embodiment, which includes a peripheral side surface 71. A number of first discharging grooves 711 and a number of second discharging grooves 712 are defined in the peripheral side surface 71. The first and second discharging grooves 711, 712 obliquely extend to opposite sides of the roller 70 relative to the hollowed shaft 73.

Figure 10:
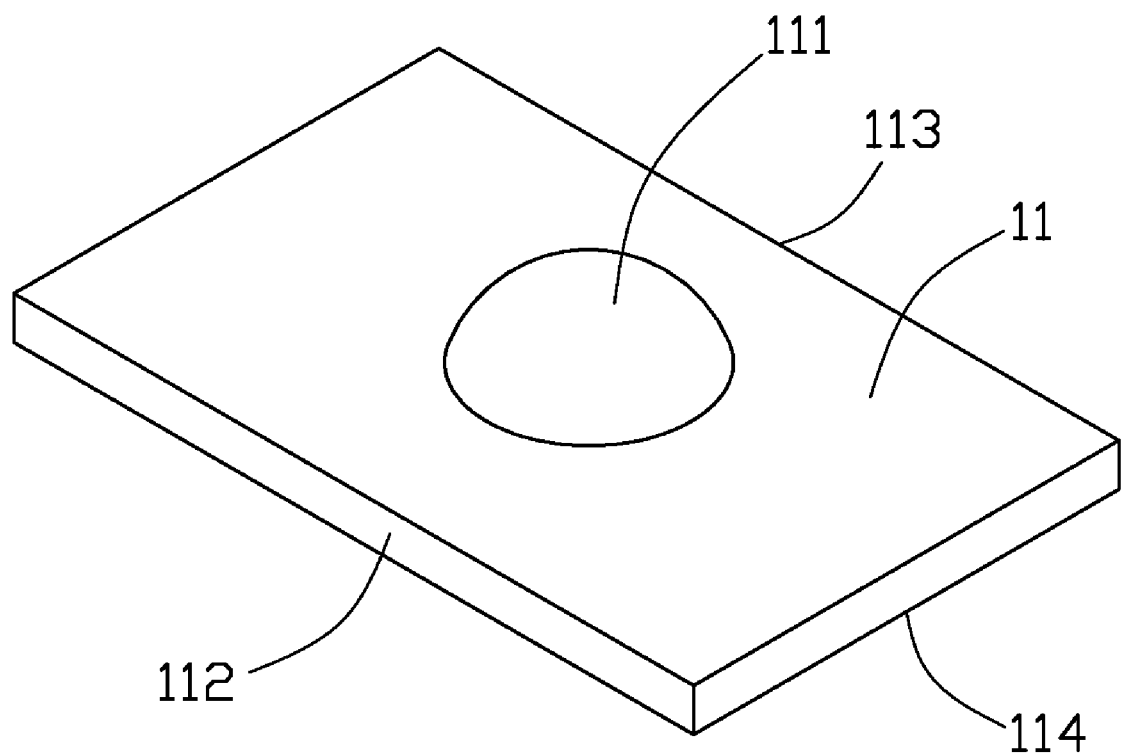
FIG. 10 is illustrates an optical lens produced using the device for forming optical lenses of FIG. 1.

Referring to FIG. 9, a process of making optical lenses using the device for forming optical lenses 10 will be described in detail as following:

A plate material 14 is disposed in the elongated channel 32 of the molding material container 30 and then the heater 13 is started for intenerating the plate material 14. Simultaneously, the heating apparatus 50 provides a heating material flowing through the output pipe 51, the shaft 23, the return pipe 52 and for heating the roller 20. The heated roller 20 rotates and presses on a surface of the intenerated plate material 14. As a result, a rectangular optical lens 11 made of the intenerated plate material 14 is molded (i.e., roll pressed) by the heated roller 41. As shown in FIG. 10, the rectangular optical lens 11 has a structure corresponding to the structure of the molding structure 22 of the roller 20. In detail, the rectangular optical lens 11 includes a hemisphere shaped optical portion 111 extrudes from a central of the optical lens 11. The rectangular optical lens 11 further includes two opposite plain side surfaces 111, 112 and a bottom surface 114. It is to be understood that the hemisphere shaped optical functional portion 111 is mated with a corresponding mold structure 22 mounted in the roller 20, the two opposite plain side surfaces 111, 112 are mated with inner side surface of the molding material container 30, and the bottom surface 114 is mated with bottom surface of the molding material container 30.

The present device 10 for forming optical lenses can form optical lenses by roll pressing; therefore, internal stress caused by process conditions in injection molding, such as injection rate, injection pressure and injection time can be avoided. Compared with conventional injection molding devices, the optical lens 11 formed by the present roll forming device 10 has an improved optical performance. Furthermore, the device 10 can form rectangular optical lens 11 without decreasing optical performance of the optical lens 11; therefore, application fields of the optical lens 11 is enlarged, in addition, optical axis of rectangular optical lens 11 can be easily aligned. In addition, it is to be understood that other than optical lenses, the device 10 can also be used to form other parts such as buttons.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A device for forming optical lenses, comprising:
    a roller having a peripheral side surface and a plurality of molding structures arranged on the peripheral side surface; and
    a molding material container including an elongated channel for containing a molding material therein, the molding material container having a bottom surface in the channel, the roller received in the channel and rotatable about an axis which is substantially perpendicular to a lengthwise direction of the elongated channel, the peripheral side surface spaced a distance from the bottom surface of the molding material container; and
    a driving mechanism for driving the roller to rotate.

2. The device for forming optical lenses as claimed in claim 1, further comprising a heating apparatus for providing circulatory heating material to the roller.

3. The device for forming optical lenses as claimed in claim 2, wherein the roller comprises a hollowed shaft with the circulatory heating material flowing therethrough.

4. The device for forming optical lenses as claimed in claim 3, wherein the molding structures are at least one of recesses and protrusions.

5. The device for forming optical lenses as claimed in claim 3, wherein a plurality of discharging grooves is defined in the peripheral side surface of the roller.

6. The device for forming optical lenses as claimed in claim 5, wherein the at least one of the discharging grooves is parallel with the hollowed shaft.

7. The device for forming optical lenses as claimed in claim 6, wherein a cross section of the at least one of the discharging grooves is U-shaped or V-shaped.

8. The device for forming optical lenses as claimed in claim 3, wherein a plurality of through holes is defined in the roller.

9. The device for forming optical lenses as claimed in claim 3, wherein a plurality of first discharging grooves and a plurality of second discharging grooves are defined in the peripheral side surface of the roller, the first and second discharging grooves obliquely extending to opposite sides of the roller relative to the hollowed shaft.

10. The device for forming optical lenses as claimed in claim 1, further comprising a heater for softening the molding material.

* * * * *